United States Patent
Chou

(10) Patent No.: US 8,981,603 B2
(45) Date of Patent: Mar. 17, 2015

(54) VOICE COIL MOTOR WITH CONNECTIVE STABILITY

(75) Inventor: Tai-Hsu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 238 days.

(21) Appl. No.: 13/533,038

(22) Filed: Jun. 26, 2012

(65) Prior Publication Data

US 2013/0221765 A1    Aug. 29, 2013

(30) Foreign Application Priority Data

Feb. 23, 2012 (TW) .............................. 101105945 A

(51) Int. Cl.
*H02K 41/035*  (2006.01)

(52) U.S. Cl.
CPC .................................. *H02K 41/0356* (2013.01)
USPC ..................................... 310/12.16; 310/12.21

(58) Field of Classification Search
CPC ... H02K 33/16; H02K 33/18; H02K 41/0354; H02K 41/0356; G02B 7/04
USPC ................ 310/12.16, 12.21–12.22; 359/824
See application file for complete search history.

(56) References Cited

U.S. PATENT DOCUMENTS

| | | | |
|---|---|---|---|
| 7,271,511 B2 * | 9/2007 | Osaka | 310/12.27 |
| 2009/0262440 A1 * | 10/2009 | Chou et al. | 359/824 |
| 2010/0309568 A1 * | 12/2010 | Takei et al. | 359/824 |
| 2011/0205648 A1 * | 8/2011 | Takei et al. | 359/824 |

FOREIGN PATENT DOCUMENTS

| | | | | | |
|---|---|---|---|---|---|
| JP | 10174410 | A | * | 6/1998 | ............ H02K 33/18 |
| JP | 2006251216 | A | * | 9/2006 | |
| JP | 2009086548 | A | * | 4/2009 | |
| JP | 2009136081 | A | * | 6/2009 | |
| JP | 2011085682 | A | * | 4/2011 | |

OTHER PUBLICATIONS

Terajima, JP2011085682 Machine Translation; Apr. 2011.*

* cited by examiner

*Primary Examiner* — Quyen Leung
*Assistant Examiner* — Eric Johnson
(74) *Attorney, Agent, or Firm* — Novak Druce Connolly Bove + Quigg LLP

(57) ABSTRACT

A voice coil motor (VCM) includes a moving unit, a fixing unit, an elastic plate, and a conducting pole. The moving unit includes a moving barrel and a coil assembly around the moving barrel. The coil assembly includes a connecting portion. The moving barrel defines a blind hole on an upper surface thereof, one end of a conducting pole being received in the blind hole. The fixing unit defines a through hole receiving the moving unit. The elastic plate is connected between the moving barrel and the fixing unit. The conducting pole provides a stable electrical connection between the elastic plate and the connecting portion notwithstanding movements of the moving barrel.

6 Claims, 5 Drawing Sheets

US 8,981,603 B2

VOICE COIL MOTOR WITH CONNECTIVE STABILITY

BACKGROUND

1. Technical Field

The present disclosure relates to voice coil motors (VCMs) and, particularly, to a VCM with connective stability.

2. Description of Related Art

VCMs may include a moving unit, a fixing unit, and an elastic plate connected between the moving unit and the fixing unit. The moving unit includes a coil assembly, and the fixing unit includes a magnet assembly. The moving unit is received in the fixing unit and is driven to move relative to the fixing unit by a magnetic force generated by the coil assembly in the magnet assembly, causing the elastic plate to deform. The elastic plate restores the moving unit when the magnetic force vanishes. The coil assembly is also electrically connected to the elastic plate by soldering and functions as electrodes of the coil assembly. However, a solder joint between the coil assembly and the elastic plate may easily deteriorate or break during the deformation of the elastic plate.

Therefore, it is desirable to provide a VCM, which can overcome the limitations described.

DETAILED DESCRIPTION

Embodiments of the disclosure will be described with reference to the drawings.

Figure 1:
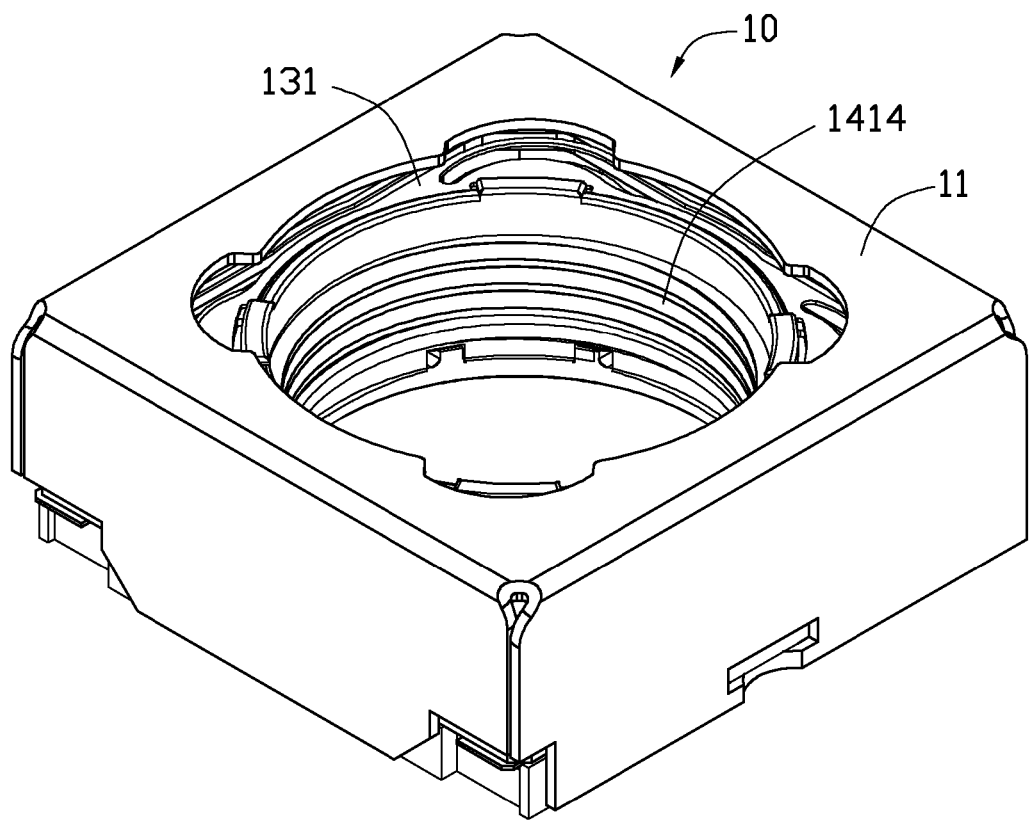
FIG. 1 is an assembled view of a VCM in accordance with an exemplary embodiment.
Figure 2:
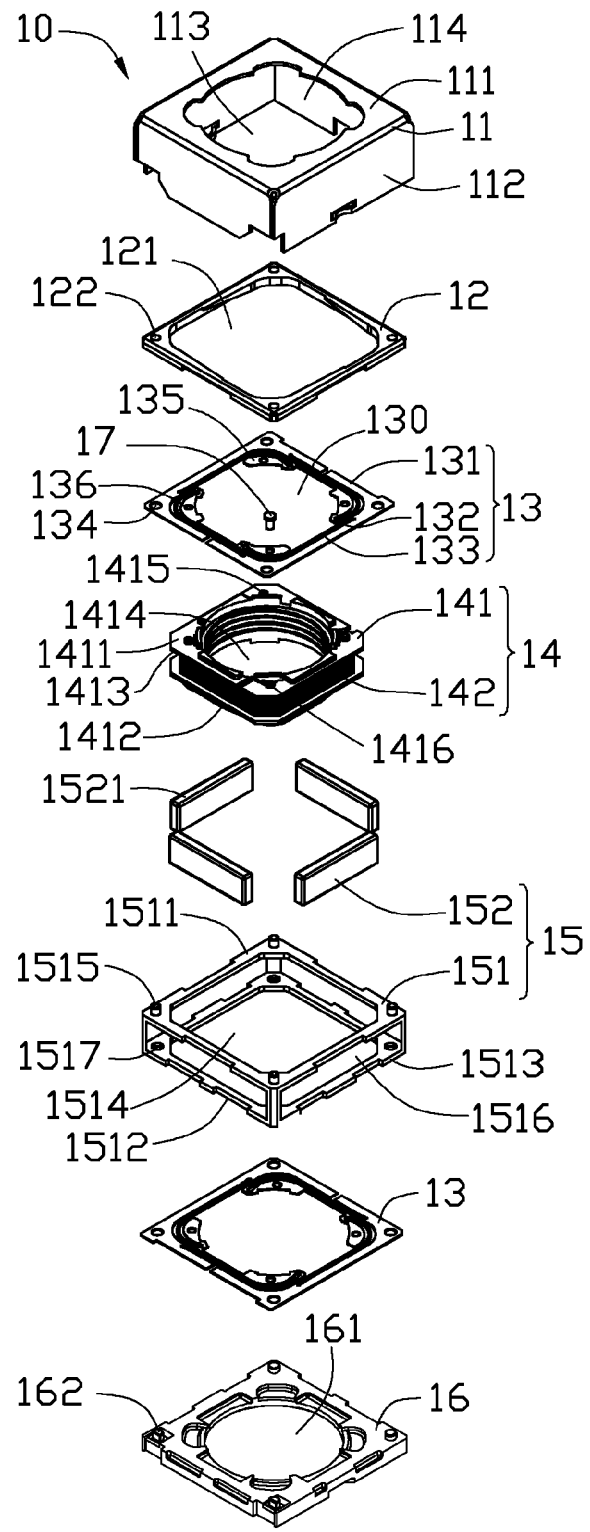
FIG. 2 is an isometric, exploded view of the VCM of FIG. 1.
Figure 3:
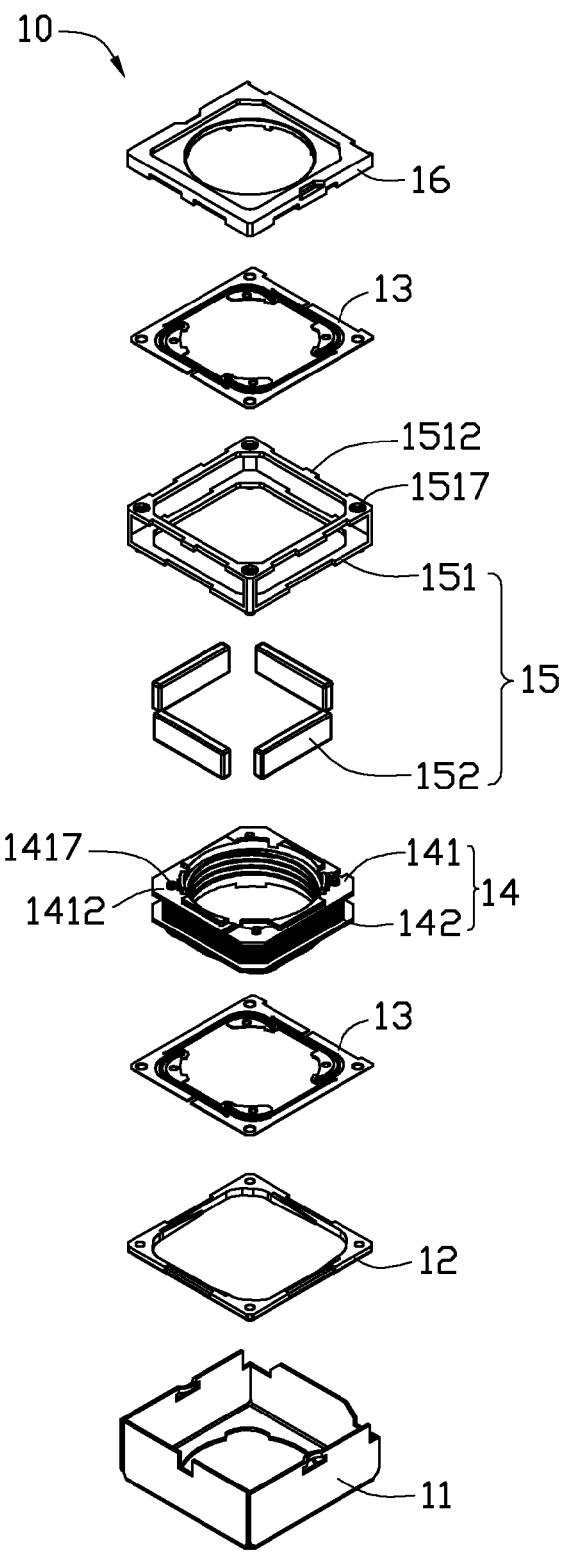
FIG. 3 is similar to FIG. 2, but viewed from another angle.
Figure 4:
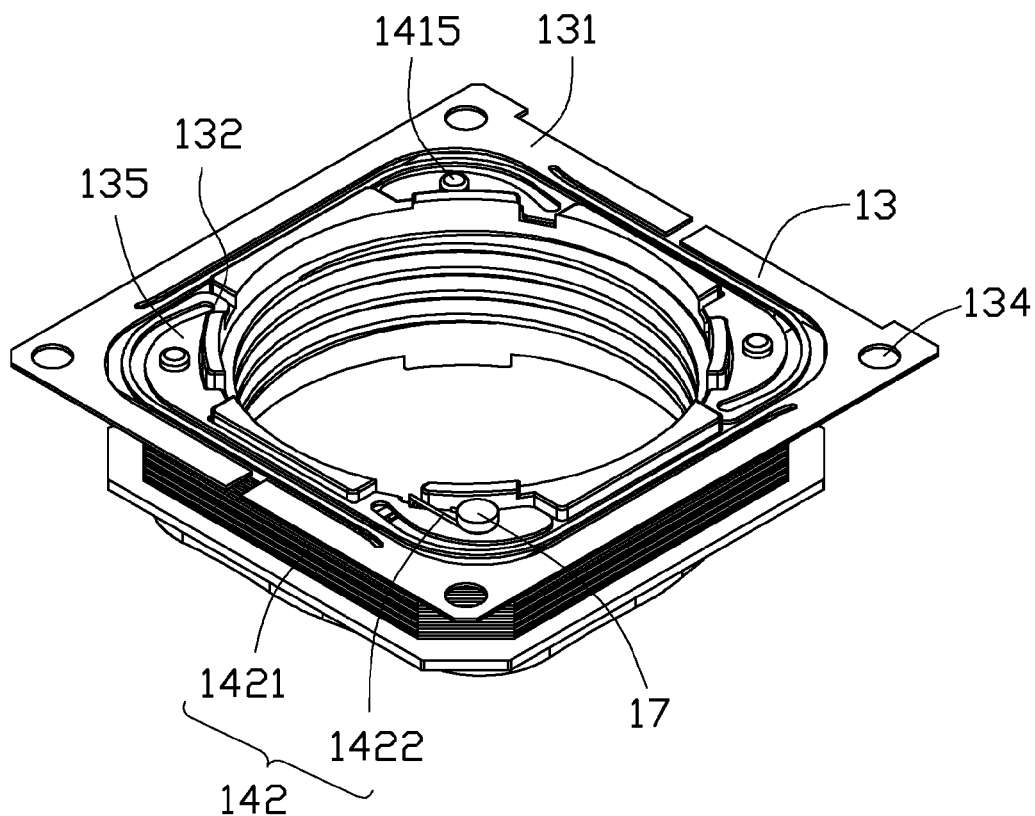
FIG. 4 is an assembled view of an upper spring and a moving unit of the VCM of FIG. 1.
Figure 5:
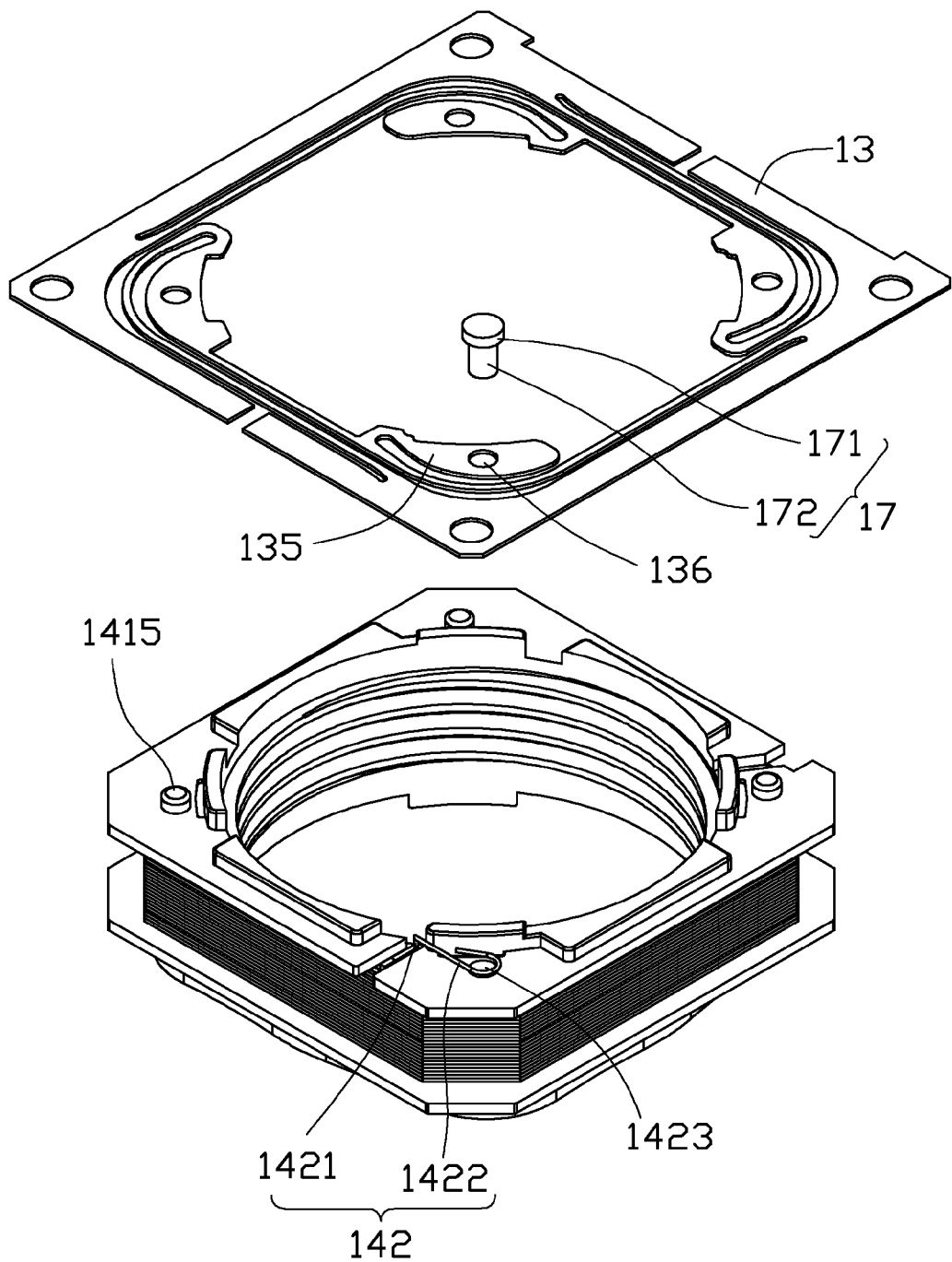
FIG. 5 is an isometric, exploded view of the upper spring and the moving unit of FIG. 3.

Referring to FIGS. 1-3, a VCM 10, according to an exemplary embodiment, includes a case 11, an upper plate 12, two elastic plates 13, a moving unit 14, a fixing unit 15, a lower plate 16, and a conducting pole 17.

The case 11 is cuboid and includes an upper cover plate 111 and a sidewall 112 substantially perpendicularly extending downward from peripheral edges of the cover plate 111. The cover plate 111 and the sidewall 112 cooperatively define a receiving room 113. The cover plate 111 defines a first through hole 114, generally at the center thereof, communicating with the receiving room 113. In this embodiment, the cover plate 111 is generally rectangular, and the sidewall 112 includes four plates extending downwards from the four edges of the cover plate 111 that are connected to each other.

The upper plate 12 is square and defines a second through hole 121 generally at a central portion thereof. The upper plate 12 defines four first positioning holes 122 at the four corners thereof.

Each elastic plate 13 is planar and defines a third through hole 130, generally at the center thereof. The elastic plate 13 includes an outer portion 131, an inner portion 132, and an elastic portion 133 connected between the outer portion 131 and the inner portion 132. The outer portion 131 defines four first connection holes 134 at the four corners thereof. The inner portion 132 includes four blades 135 adjacent to the corners of the outer portion 131. Each blade 135 defines a second connection hole 136.

The moving unit 14 includes a moving barrel 141 and a coil assembly 142. The moving barrel 141 includes an upper surface 1411, a lower surface 1412, and a first outer surface 1413 connected between the upper surface 1411 and the lower surface 1412. The moving barrel 141 defines a fourth through hole 1414 extending through the upper surface 1411 and the lower surface 1412. Three first connection poles 1415 extend upward from the upper surface 1411. The moving barrel 141 defines a blind hole 1416 on the upper surface 1411. The three first connection poles 1415 and the blind hole 1416 are positioned at the four corners of the upper surface 1411, generally surrounding the fourth through hole 1414. Four second connection poles 1417 extend down from the lower surface 1412, generally at the four corners of the lower surface 1412.

The coil assembly 142 includes a coil portion 1421 and a connecting portion 1422. The coil portion 421 is annular and encircles the first outer surface 1413 of the moving barrel 141. The connecting portion 1422 is electrically connected to the coil portion 1421. One end of the connecting portion 1422 facing away the coil portion 1421 is bent into the shape of a hook 1423.

The fixing unit 15 includes a fixing frame 151 and a magnet assembly 152. The fixing frame 151 is cuboid and includes a top surface 1511, a bottom surface 1512, and a second outer surface 1513 connected between the top surface 1511 and the bottom surface 1512. The fixing frame 151 defines a fifth through hole 1514 extending through the top surface 1511 and the bottom surface 1512. Four first positioning poles 1515 extend up from the top surface 1511, generally at the four corners of the top surface 1511. The fixing frame 161 defines four receiving holes 1516 on the second outer surface 1513. Each of the receiving holes 1516 is generally rectangular and communicates with the fifth through hole 1514. The fixing frame 151 defines four second positioning holes 1517 in the bottom surface 1512 generally at the four corners of the bottom surface 1512.

The magnet assembly 152 includes four generally rectangular magnets 1521 respectively received in the four receiving holes 1516 of the fixing frame 151. Each magnet 1621 includes a magnetic pole directly facing the second outer surface 1513, and the other magnetic pole facing in the opposing direction.

The lower plate 16 is square and centrally defines a sixth through hole 161. Four second positioning poles 162 extend up from the four corners of the lower plate 16 respectively.

The conducting pole 17 is made of conductive material, such as copper. The conducting pole 17 includes a first cylinder portion 171 and a second cylinder portion 172 positioned one end of the first cylinder portion 171. The internal diameter of the second connection hole 136 is slightly less than the external diameter of the first cylinder portion 171 but slightly greater than the external diameter of the second cylinder portion 172.

In assembly of the VCM 10, the moving unit 14 is movably received in the fifth through hole 1514 of the fixing frame 151. The coil portion 1421 is opposite to the magnet assembly 162. One of the elastic plates 13 is sandwiched between the upper plate 12 and the fixing frame 151. The first positioning poles 1515 of the fixing frame 151 are received in the first connection holes 134 of the outer portion 131 and the first positioning holes 122 of the upper plate 12. The first connection poles 1415 of the moving barrel 141 are received in the second connection holes 136 of the inner portion 132. The second cylinder portion 172 of the conducting pole 17 penetrates one second connection hole 136 of the inner portion 132 and is received in the blind hole 1416 of the moving barrel 141. The hook 1423 of the coil assembly 142 is sleeved on the second cylinder portion 172 and locked between the first cylinder portion 171 and the inner portion 132. The coil portion 1421 is thereby electrically connected to the elastic plate 13 by means of the hook 1423.

The other elastic plate 13 is sandwiched between the lower plate 16 and the fixing frame 151. The second positioning poles 162 of the lower plate 16 are received in the first connection holes 134 of the outer portion 131 and the second positioning holes 1517 of the fixing frame 151. The second connection poles 1417 of the moving barrel 141 are received in the second connection holes 136 of the inner portion 132.

The case 11 receives the upper plate 12, the elastic plates 13, the moving unit 14, the fixing unit 15, the lower plate 16, and the conducting pole 17. In an initial state, the first through hole 114, the second through hole 121, the third through hole 130, the fourth through hole 1414, the fifth through hole 1514, the sixth through hole 161 are coaxial with each other.

During the process of focusing, as the coil assembly 142 is surrounded by the magnet assembly 152, when the coil assembly 142 is supplied with an electrical current through the elastic plate 13, the coil assembly 142 experiences a Lorentz force along the optical axis of VCM 10. Therefore, the moving unit 15 is driven to move along the optical axis to find a position of equilibrium, that is to say, a focus position. As the conducting pole 17 is electrically connected to the elastic plate 13 and the coil assembly 142, and one end of the conducting pole 17 receiving in the blind hole 1416 of the moving unit 14, the coil assembly 142 and the elastic plate 13 are firmly connected during the deformation of the elastic plate 13.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor (VCM), comprising:
a moving unit comprising:
a moving barrel comprising an upper surface, a lower surface, and a first outer surface connected between the upper surface and the lower surface; the moving barrel defining a blind hole on the upper surface; and
a coil assembly comprising a coil portion encircling the first outer surface and a connecting portion connected to the coil portion;
a fixing unit defining a through hole, the through hole receiving the moving unit;
an elastic plate connected between the moving barrel and the fixing unit, and defining a plurality of first connecting holes and a plurality of second connecting holes; and
a conducting pole electrically connected to the elastic plate and the connecting portion, wherein the conducting pole comprises a first cylinder portion and a second cylinder portion positioned one end of the first cylinder portion, an internal diameter of the second connection hole is slightly less than an external diameter of the first cylinder portion and is slightly greater than an external diameter of the second cylinder portion, the second cylinder portion extends through one of the second connecting holes and is received in the blind hole, and the first cylinder portion pressing against the elastic plate.

2. The VCM of claim 1, wherein the fixing unit comprises a fixing frame and a magnet assembly, the fixing frame comprises a top surface, a bottom surface, and a second outer surface connected between the top surface and the bottom surface, the fixing frame defines a plurality of receiving holes in the second outer surface, the receiving holes receives the magnet assembly.

3. The VCM of claim 2, wherein the fixing frame comprises a plurality of positioning poles extending up from the top surface; each of the positioning poles passes through a respective one of the first connection holes.

4. The VCM of claim 3, wherein the elastic plate comprises an outer portion, an inner portion, and an elastic portion connected between the outer portion and the inner portion; the outer portion defines the first connection holes; the inner portion is connected to the moving barrel.

5. The VCM of claim 4, wherein the moving barrel comprises a plurality of connection poles extending up from the upper surface; the elastic plate defines the second connection holes on the inner portion; each of the connection poles and the conducting pole passes through a respective one of the second connection holes.

6. The VCM of claim 1, wherein one end of the connecting portion facing away from the coil portion is bent into a hook, and the hook is sleeved on the conducting pole.

\* \* \* \* \*